US012770483B2

(12) United States Patent
Yu

(10) Patent No.: US 12,770,483 B2
(45) Date of Patent: Oct. 20, 2026

(54) LINEAR MULTI-PARAMETER FIRE DETECTION SYSTEM

(71) Applicant: Wenbo Yu, Cary, NC (US)

(72) Inventor: Wenbo Yu, Cary, NC (US)

(73) Assignee: Linear-Detection, Inc, Cary, NC (US)

( * ) Notice: Subject to any disclaimer, the term of this patent is extended or adjusted under 35 U.S.C. 154(b) by 280 days.

(21) Appl. No.: 18/756,309

(22) Filed: Jun. 27, 2024

(65) Prior Publication Data

US 2026/0004646 A1 Jan. 1, 2026

(51) Int. Cl.
*G08B 17/10* (2006.01)

(52) U.S. Cl.
CPC .................................... *G08B 17/10* (2013.01)

(58) Field of Classification Search
CPC ...... G08B 17/06; G08B 17/10; G08B 17/117; G08B 29/186
See application file for complete search history.

(56) References Cited

U.S. PATENT DOCUMENTS 2,992,310 A 7/1961 Babany
3,644,913 A 2/1972 Matsui
3,872,419 A 3/1975 Groves et al.
4,175,437 A 11/1979 Burt
4,491,822 A 1/1985 Davis
4,540,972 A 9/1985 Davis
4,871,999 A 10/1989 Ishii et al.
5,422,484 A 6/1995 Brogi et al.
2004/0035179 A1 2/2004 Koch
2005/0200475 A1 9/2005 Chen
2009/0059998 A1 3/2009 Hou
2011/0298623 A1 12/2011 Lenkeit et al.
2013/0120150 A1* 5/2013 Aebersold .............. G08B 17/10 340/630
2016/0101306 A1* 4/2016 Hennegan .............. A62C 37/36 169/17

(Continued)

FOREIGN PATENT DOCUMENTS

AU 200633204 B8 8/2007
CN 101388134 A 3/2009

(Continued)

*Primary Examiner* — Omer S Khan
(74) *Attorney, Agent, or Firm* — James G. Passe; Passe Intellectual Property

(57) ABSTRACT

A multi-parameter cable-based linear fire detection system that significantly enhances the capabilities of traditional fire detection systems. This system includes a plurality of sensing modules positioned along the cable, each equipped with a volatile organic compounds (VOC) sensor, a combustible gas sensor, a smoke sensor, an infrared sensor, and linear heat sensors. It also features an addressing module for precise location identification of the fire hazard. The system incorporates an air sampling function with an air tube and multiple inlets to continuously draw and analyze air samples in real-time. By monitoring early indicators such as gas emissions, smoke, and heat, the system ensures comprehensive coverage and timely triggered alarms. The integration of these advanced sensors and functions prevents false positives, provides accurate detection of fire locations, and enhances fire safety in high-risk environments such as battery energy storage facilities and other industrial applications.

1 Claim, 3 Drawing Sheets

(56) References Cited

U.S. PATENT DOCUMENTS

2021/0166540 A1* 6/2021 Ribalda Galvez ... G08B 25/002

FOREIGN PATENT DOCUMENTS

| | | | |
|---|---|---|---|
| CN | 107025428 | B | 1/2022 |
| EP | 0011461 | A1 | 5/1980 |
| EP | 0078675 | A2 | 5/1983 |
| EP | 0279969 | A1 | 8/1988 |
| EP | 0655720 | A1 | 5/1995 |
| EP | 0418409 | B1 | 1/1996 |
| EP | 2908297 | A1 | 8/2015 |
| WO | 2004059589 | A2 | 7/2004 |

* cited by examiner

LINEAR MULTI-PARAMETER FIRE DETECTION SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a multi-parameter cable based linear fire detector system. In particular, it can monitor fire parameters in real time.

Description of Related Art

Fire detection in the industrial fields such as battery energy storage, power generation, transportation, data centers, etc. primarily employ point type smoke detectors and linear heat detectors. Each detector independently evaluates the data from each of the detectors. If there is a parameter outside established thresholds then the entire system triggers a fire alarm.

Current linear heat detection systems have low detection sensitivities. And the detection is limited to only heat, a single parameter, which lacks the comprehensive picture of the fire hazard condition. In addition, current systems cannot pinpoint the fire location. Even though technologies like fiber optic linear heat detectors are capable of reporting fire locations, they are computer model-based estimates, which is not accurate.

Due to the inherent limitations and distributive nature of these fire detection systems, it is impossible to achieve complete coverage of fire detection for the protected areas. This threshold alarm method is singular and lacks comprehensive consideration of on-site fire environments. This can lead to false alarms, missed alarms and delayed alarm response.

Particularly in battery energy storage applications, early detection is crucial due to rapid fire propagation. However, traditional linear fire detectors or point type smoke detectors are not sufficient to achieve this. These conventional systems often fail to detect the early stages of thermal runaway and the specific gases released by battery cells before a full-blown fire occurs. The inability to promptly detect the initial signs of overheating, gas venting delays critical response times, increasing the risk of extensive damage and safety hazards. Therefore, advanced detection technologies that can monitor temperature variations, gas emissions, smoke, and other early indicators of battery failure are essential to ensure timely and effective fire prevention and mitigation in these high-risk environments.

BRIEF SUMMARY OF THE INVENTION

The present invention is a multi-parameter cable-based linear fire detection system that effectively addresses the inadequacies of traditional fire detection methods in battery energy storage facilities and other industrial facilities. It overcomes the difficulties of previous fire detection systems by including 5 sensors: infrared sensor, smoke sensor, volatile organic compound (VOC) sensor, combustible gas sensor, and linear heat sensor, along with an addressing module. These sensors are connected in series and linked to a signal processing unit that prevents false positives and precisely identifies the exact location of the fire. Additionally, the system features an air sampling function, utilizing an air tube with multiple inlets along the cable to continuously draw air samples for real-time analysis. This innovative system is capable of monitoring critical early indicators of fire, ensuring comprehensive coverage and timely intervention. This advanced detection method significantly enhances fire safety and reduces the risk of extensive damage in high-risk industrial environments.

Accordingly, in one embodiment, there is a linear fire detection system comprising:

a) a signal processing unit;

b) a cable of a selected length wherein the cable comprises an air tube for sampling air and a pair of insulated electrical conducting wires for power and data transmission among the sensing modules and the signal processing unit, and a linear heat sensor for monitoring heat between the sensing modules;

c) wherein the linear heat sensor comprises a pair of electrical conducting wires insulated with heat sensitive material;

d) a plurality of sensing modules positioned along the cable, each sensing module comprising a volatile organic compounds (VOC) sensor, a combustible gas sensor, a smoke sensor, and an infrared sensor and linear heat sensor;

e) wherein each sensing module also includes an addressing module; and f) wherein the air tube has one or more air inlets.

DETAILED DESCRIPTION OF THE INVENTION

Figure 1:
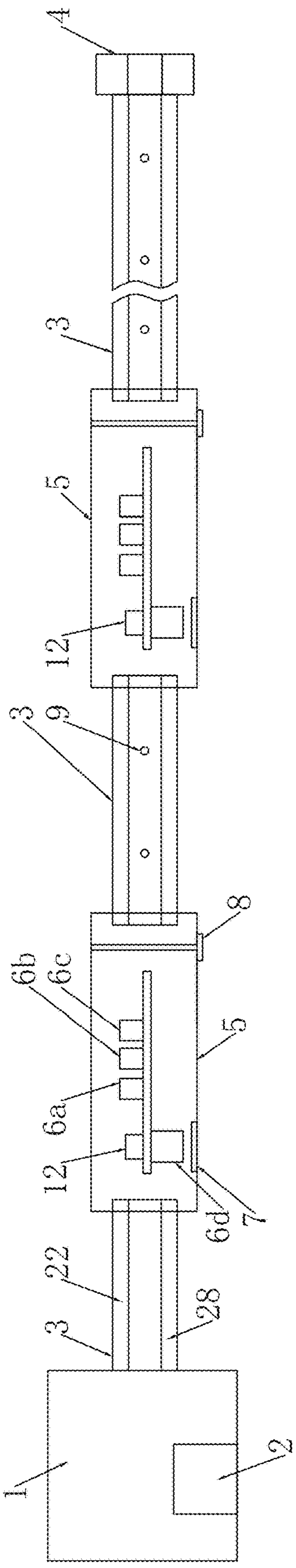
FIG. 1 is a first embodiment of the linear fire detection system.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publication may set out definitions of a term that conflict with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "linear fire detection system" refers to multiple fire detecting sensors connected with continuous linear heat sensors, designed to detect fire along the length of a detector cable. Where fire detection is necessary of an extended length (up to 4,000 meters, or more), a cable with a detection system is placed especially to detect fires that are remote from the control unit. Current units were only capable of a length not greater than 2,000 meters. Current units also suffer from false positive difficulty in determining where the fire is along the cable and is limited to how they determine a fire. The present invention combines an addressing module with 5 sensors which when taken together can pinpoint the fire and determine severity and type of fires.

As used herein, the term "signal processing unit" refers to a device which reads the information delivered by one or more sensing modules and analyzes the result to determine location, type and intensity of the fire.

As used herein, the term "cable" refers to a length of cable of desired length comprising one or more air tubes and electrical conducting elements, and linear heat sensors.

As used herein, the term "linear heat sensor" refers to a length of cable of desired length comprising a pair of electrical conducting elements, insulated with heat sensitive material. The use of linear heat sensors among the sensing modules is to achieve full heat detecting coverage of the protected area and(or) object.

As used herein, the term "heat sensitive material" refers to material which changes property as temperature changes which can be used to detect heat changes present in a fire.

As used herein, the term "air tube" and "air tube inlets" refers to the air tubes and inlets are used to take air samples along the route of the linear detector cable. An aspiration fan operating within the signal processing unit constantly draws air from the air tube. The inlets draw air samples at each section along the linear detector. This is to achieve full coverage of the protected area and(or) object. The air sample passes through an air filter, then to the smoke, gas, and volatile organic compounds (VOC) detectors that reside in each sensing module. The signal processing unit then analyze the signals sent by these sensors from the sensing module to determine whether there is a fire and where. Air is let in to the air tube via holes in the air tube, or holes in the sensing modules and the like.

As used herein, the term "electrical conducting element" refers to wires or other conductors that can transmit the information from the sensors and the address module and deliver them to the signal processing unit. And supply electrical power to the components.

As used herein, the term "sensing module" refers to a plurality of modules positioned along the cable at desired intervals. Each sensing module comprises sensing elements and an address module.

As used herein, the term "sensing elements" refers to 4 specific sensors namely a volatile organic compounds (VOC) sensor, a combustible gas sensor, a smoke sensor, and an infrared sensor. The position of the 4 sensors (volatile organic compounds (VOC), gas, smoke, infrared) can be flexible, based on packaging designs, but all of them should reside inside of the protective housing for protection. The infrared sensor filter functions to protect the infrared sensor, and to focus specific wavelengths of infrared light onto the sensor's surface. In addition, there is an air filter. The air filter is to filter out unwanted debris and particles in the air before the air passes through the sensors.

As used herein, the term "addressing module" refers to a module in each sensing module that identifies the location of the sensing module to determine where the detected fire is positioned at.

As used herein, the term "plurality of air inlets" refers to inlets in the air tube to take in air samples along the length of the device. It can also mean air inlets in the sensory module.

DRAWINGS

Figure 2:
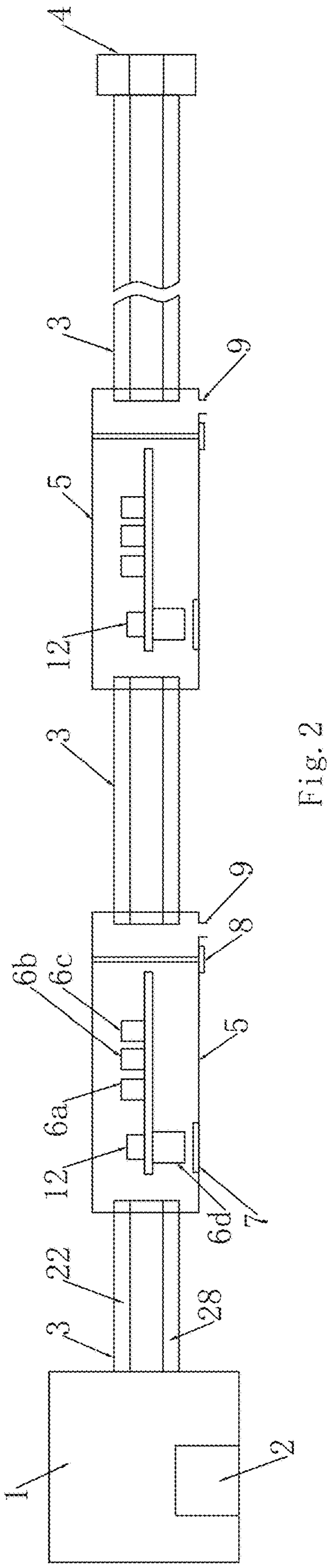
FIG. 2 is an alternate embodiment of the linear fire detection system.

Now referring to the drawings, FIG. 1 is a view of an embodiment of the linear fire detection system with air inlet holes or FIG. 2 without holes in the cable, but in the protective housing. Signal processing (central control) unit 1 with fan to draw in air samples 2 is positioned at one end of cable 3. The cable 3 contains linear heat sensors 28 and power and data transmission bus 22 and one or more air tubes which terminated at the opposite end with end cap 4. A plurality of sensing modules 5 are positioned along the cable 3. Each sensing module contains a volatile organic compounds (VOC) sensor 6*a*, a gas sensor 6*b*, smoke sensor 6*c* with air filter 8 to remove debris and unwanted particles and an infrared sensor 6*d* with infrared sensor filter 7 to protect the sensor, and to focus specific wavelengths of infrared light onto the sensor's surface. In this view we also have air inlets 9. Also positioned within the sensing modules 5 is an addressing module 12 for determining which sensing module is sending information to the signal processing unit.

Figure 3:
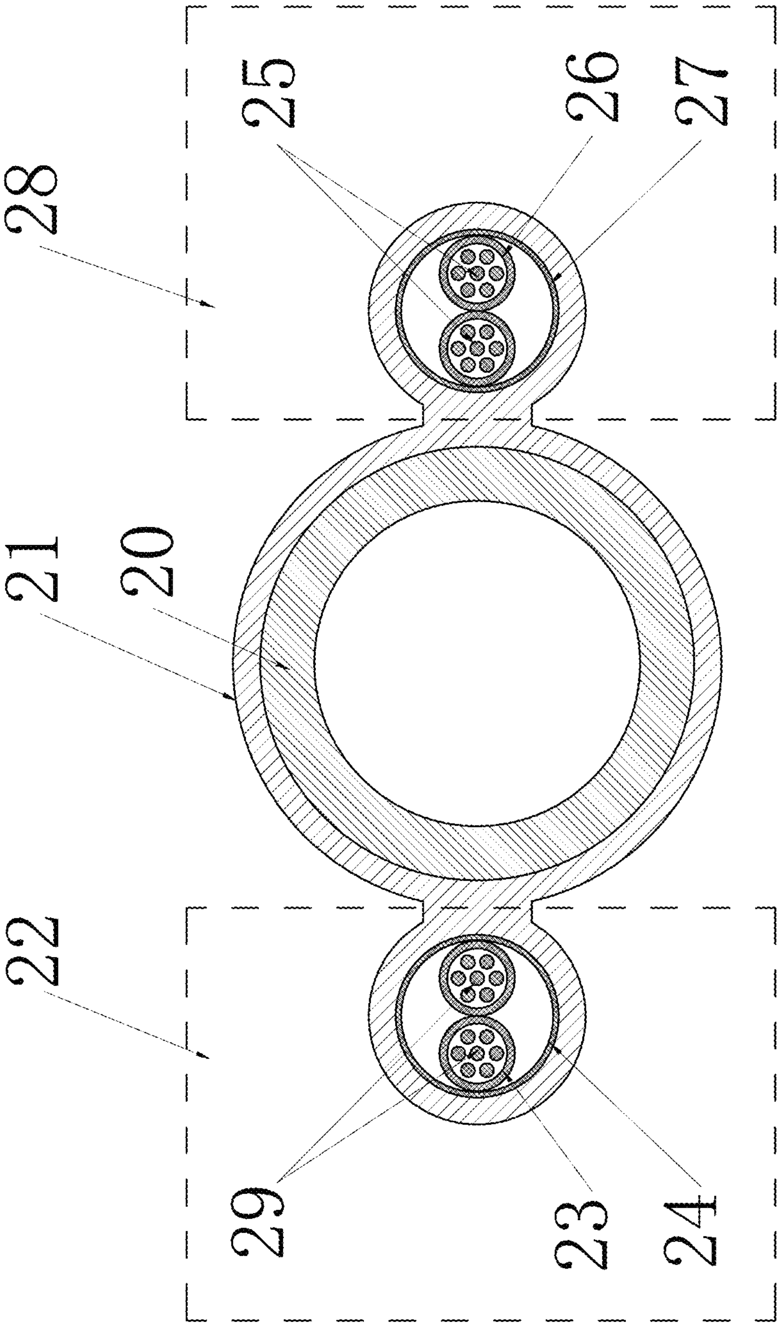
FIG. 3 is a cross section of the linear fire detector cable showing the air tube.

FIG. 3 is a cross section of linear fire detector. Air tube 20 with protective outer sheath 21 is shown. On one side of air tube 20 is power and data transmission bus 22 with metal conductors 29 insulating sheath 23 and an aluminum foil layer 24. On the other side of the air tube 20 is linear heat sensor 28 with metal conductors 25 with heat sensitive material insulation 26. An aluminum foil layer 27 is also shown.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A linear fire detection system comprising:

a) a signal processing unit;

b) a cable of a selected length wherein the cable comprises an air tube for sampling air and a pair of insulated electrical conducting wires for power and data transmission among a plurality of sensing modules and the signal processing unit, and a linear heat sensor for monitoring heat between the sensing modules;

c) wherein the linear heat sensor comprises a pair of electrical conducting wires insulated with heat sensitive material;

d) wherein the plurality of sensing modules are positioned along the cable, each sensing module comprising a volatile organic compounds (VOC) sensor, a combustible gas sensor, a smoke sensor, and an infrared sensor and linear heat sensor;

e) wherein each sensing module also includes an addressing module; and f) wherein the air tube has one or more air inlets.

* * * * *